Nov. 3, 1931.        A. E. FREEMAN ET AL        1,829,825
BRAKE FOR POWER DRIVEN SHAFTS
Original Filed Sept. 11, 1929        2 Sheets-Sheet 1

INVENTORS
A. E. Freeman and
BY  W. T. Livermore
ATTORNEY

Nov. 3, 1931.   A. E. FREEMAN ET AL   1,829,825
BRAKE FOR POWER DRIVEN SHAFTS
Original Filed Sept. 11, 1929   2 Sheets-Sheet 2

INVENTORS
A. E. Freeman and
BY  W. T. Livermore
ATTORNEY

Patented Nov. 3, 1931

1,829,825

UNITED STATES PATENT OFFICE

ALBERT E. FREEMAN, OF EAST ORANGE, AND WILLIAM T. LIVERMORE, OF WESTFIELD, NEW JERSEY, ASSIGNORS TO AMERICAN TELEPHONE AND TELEGRAPH COMPANY, A CORPORATION OF NEW YORK

BRAKE FOR POWER DRIVEN SHAFTS

Application filed September 11, 1929, Serial No. 391,912. Renewed August 28, 1931.

This invention relates to hoisting or pulling apparatus such as winches, and more particularly to braking mechanism for the worm shafts associated therewith.

One of the objects of the invention consists in the provision of braking mechanism for worm shafts of winches.

Another object of the invention is to provide mechanism which will produce a minimum amount of frictional resistance on a worm shaft when rope is being wound on the winch drum, and a sufficient amount of frictional resistance on the shaft when said rope is being unwound from the drum to stop the rotation of the shaft when power ceases to be applied thereto, as in the case of lowering a suspended load.

A further object is to provide braking mechanism for worm shafts which is simple and comparatively inexpensive.

These and further objects of the invention will be apparent from the following description, when considered in connection with the accompanying drawings, in which one embodiment is illustrated.

Figure 1:
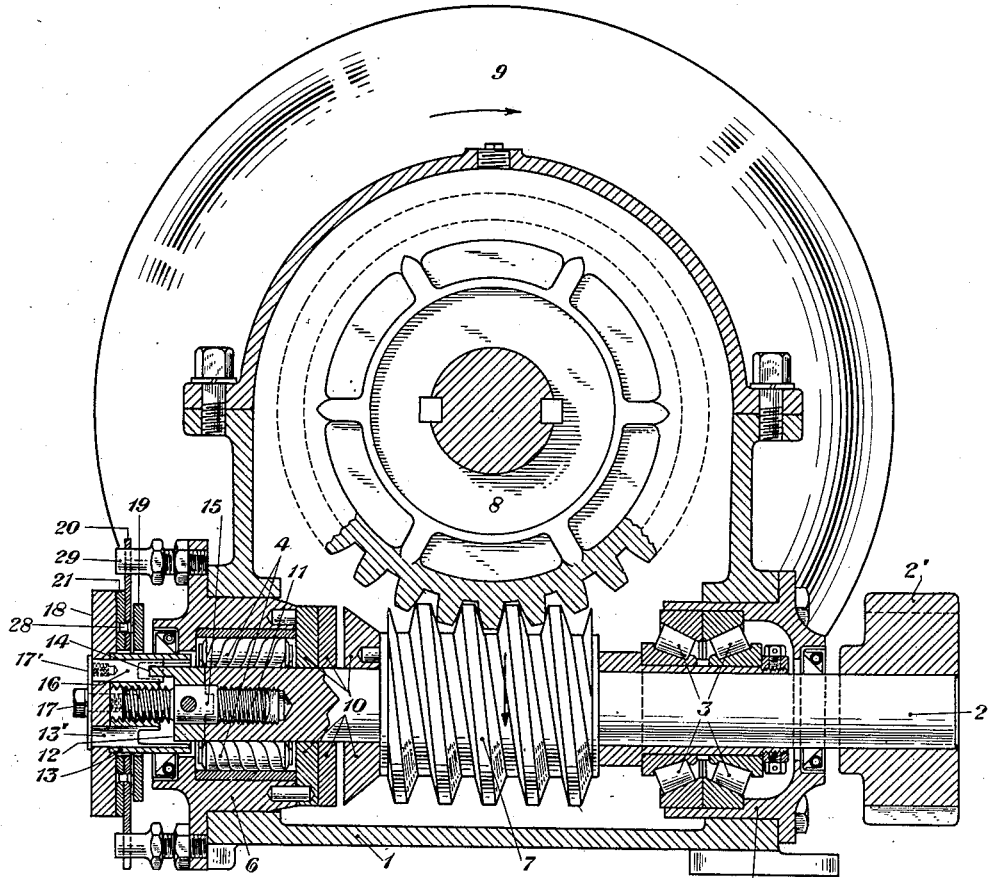
Figure 2:
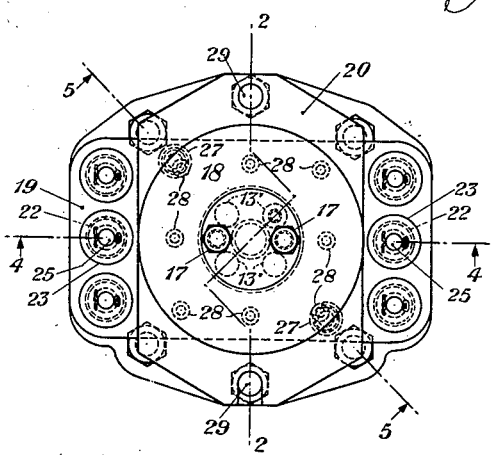
Figure 3:
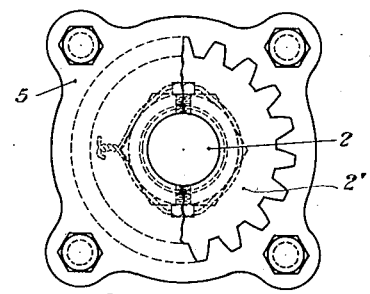
Figure 4:
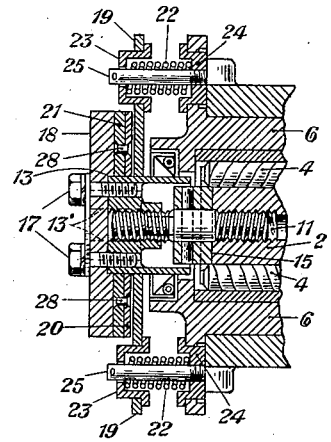
Figure 5:
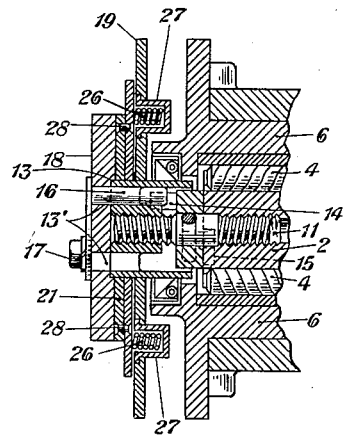
Figure 6:
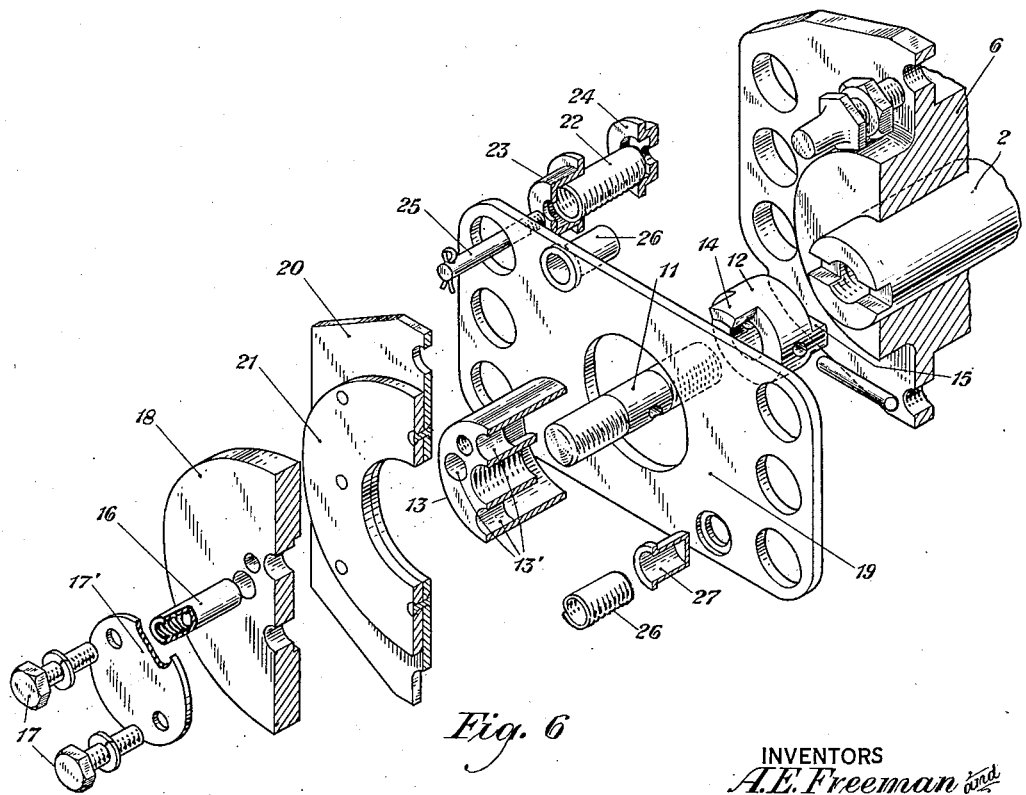

Referring to the drawings, Figure 1 is a side elevation in section of the improved braking mechanism and its associated elements taken on the line 2—2 of Fig. 2; Fig. 2 is a left end view of the worm shaft illustrated in Fig. 1; Fig. 3 is a right end view of the worm shaft illustrated in Fig. 1; Fig. 4 is a section taken on the line 4—4 of Fig. 2; Fig. 5 is a section taken on the line 5—5 of Fig. 2; and Fig. 6 is an exploded view of the left end of the shaft and its associated elements.

In the improved arrangement, a housing 1 is mounted on a suitable base and carries a shaft 2. The shaft is shown as being journaled at one end in bearings 3 and at the other end in roller bearings 4. The bearings 3 are preferably of a character which will take a radial and thrust load, such, for instance, as tapered roller bearings. The bearings 3 may be mounted on a sleeve pressed on the shaft and are held in a cage 5 which is bolted through its end plate to the housing 1. A nut is provided on the sleeve at one end of the race for the tapered bearings 3 to hold the other end of the race firmly against a shoulder on the sleeve, and thus prevent its displacement. The roller bearings 4 are mounted in a cage 6, which is bolted through its end plate to the housing 1. The cages 5 and 6 may be provided at their ends with a casing for holding packing, which prevents the escape of oil or other lubricant, as indicated in Fig. 1.

A worm 7 is formed integral with the shaft 2 between the bearings 3 and 4, and the worm and shaft are adapted to be slightly moved longitudinally, as will presently appear. This worm is driven by the shaft 2 through the agency of a sprocket 2' which is splined or otherwise fixed to the extended end of the shaft. This sprocket engages a chain, or the like, which is connected to a power take-off, or other mechanism from which power is transmitted, to drive the shaft and worm. The worm 7 meshes with a worm wheel 8 which is suitably mounted on a shaft and enclosed in a housing. A winch drum, an end flange of which is shown at 9, upon which wire, rope or cable may be wound and unwound, is mounted on a common shaft with the worm wheel, and is rotated thereby in a well-understood manner.

The shaft 2 has a series of thrust washers 10 mounted thereon at one side of the worm 7. For the purpose of illustration, the inner thrust washer is shown as being attached by means of a pin to one end of the worm 7, and the outer washer is similarly attached to the cage 6. The function of these washers will later appear.

A stud 11 is threaded into and suitably secured to one end of the shaft 2 and rotates with it. This stud is provided with a stop collar 12 which may be pinned thereto at its approximate midsection. The stud 11 also has its other or outer end provided with a threaded surface. The outer threaded end carries a circular nut 13 which is provided with a circular recessed portion at the inner end thereof. The stop collar 12 has a finger or projection 14 at one end, and a key projection 15 at the other end. The projection 15 registers in a transverse slot in the end of the shaft 2 and locks the collar thereto. A series of holes 13', shown in the present instance as being four in number, is provided in the nut 13. These holes extend through the nut from its outer surface into its circular recessed portion. A stop pin 16 is adapted to be inserted in any of these holes, depending upon the adjustment which may be required to provide sufficient clearance between the brake plate and pressure plate which are to be presently described. An interior thread may be provided at the outer end of the stop pin 16 to which a suitably threaded implement may be applied during the operation of inserting or withdrawing the pin from any of the holes 13' with which it may be associated. The pin 16 extends into the circular recessed portion a sufficient distance to engage with the projection 14 on the collar 15, so that the pin and projection are only free to rotate slightly less than one revolution with respect to each other in either direction before they come in contact with each other. The rotation of the nut 13 is thus limited by its stop pin 16 contacting with the projection 14 on the stop collar 12. During this rotation, the outer thread on stud 11 causes the nut 13 to move axially a distance nearly equal to the pitch of the outer threads on the stud 11.

Bolts 17 pass through a circular plate 17' and a brake disk 18 into threaded engagement with the outer end of the nut 13, and couple these elements together. The circular plate 17' lies flatly against the outer surface of the disk 18 and serves to prevent the outward displacement of the stop pin 16 which extends through the disk 18. The disk has a circular cut-away portion on its inner surface in which the outer end of the nut 13 registers. There is a slight clearance between this cut-away portion and the end of the stud 11. The nut 13 passes successively through the approximate centers of a pressure plate 19, a brake plate 20 and its friction lining 21.

The pressure plate 19 may be substantially in the form of a rectangle, and carries a series of main pressure springs 22 which may be distributed as shown, for example, in sets of three near the shorter sides of the rectangle. The ends of the springs 22 are positioned in thimbles 23 and 24. These thimbles are positioned in holes provided in the pressure plate 19 and the cage 6, respectively. The thimbles are maintained in position by means of studs 25. These studs extend through the coiled springs 22 and the centers of thimbles 23 and 24, and are threaded at one end into thimbles 24. The opposite or outer ends of the studs are provided with holes through which cotter-pins may be inserted to keep the outer thimbles 23 in such position that the springs 22 are compressed. The pressure plate 19, in addition to the main pressure springs 22, also carries light pressure springs 26, as more clearly shown in Fig. 5. These springs are contained in thimbles 27 which are inserted through openings in the pressure plate, and countersunk portions provided in said plate permit seating the flanges of the thimbles. The light pressure springs 26 bear against the back of the brake plate 20, which is attached to the bearing cage 6 by the anchor screws 29, and thus prevented from rotating. The brake plate, however, is free to move longitudinally. The plate 20 has a friction lining 21 secured to it by rivets 28, and the lining is always held in light contact with the inner surface of the disk 18 by means of the light springs 26. This frictional contact tends to hold the disk 18 and nut 13 from rotating, thereby causing the stud 11 to act, as will presently appear, whenever the direction of rotation of the worm 7 is reversed.

The operation is as follows: Let us assume that the winch is being operated to lift a load, and the drum 9 is rotating in the direction indicated by the arrow in Fig. 1, and that power for this operation is applied to the shaft 2 through the sprocket 2'. Under these conditions, a rope wound about the drum may be assumed to extend from the top of the drum 9 in a direction towards the left, the rope then extending over a pulley with a load applied to the end of the rope. In order to elevate the load, the drum 9 must then move in a clockwise direction. Hence, power must be so applied to the sprocket 2' as to drive it in a counter-clockwise direction when the gear is viewed from the right in Fig. 1. Under these conditions, back pressure through the drum upon the worm 7 tends to hold the shaft 2 towards the right against the end thrust bearings 3, so that the thrust washers 10 are separated. Consequently, the friction of these washers is not applied during the elevation of the load.

At the beginning of the rotation of the shaft 2 in elevating the load, it may be assumed the lug or projection 14 on the stop collar 12 rests against the pin 16 to the front thereof in Fig. 1. As the shaft rotates in a counter-clockwise direction, the lug 14 rotates with the shaft until it approaches the end of one revolution until it again engages the pin 16 at the rear side thereof. During this partial revolution of the shaft, the pin 16 is idle, and hence the nut 13 does not rotate with the shaft. The stud 11, however, which does rotate with the shaft, and is in screw-threaded engagement with the nut 13, drives the nut and the several members carried thereby to the left. When the lug 14 engages behind the pin 16, however, the nut 13 moves with the shaft during the ensuing revolutions thereof due to the engagement of the lug 14 with the pin 16, and further axial movement of the nut 13 to the left ceases.

The operation of driving the nut 13 to the left during its initial non-rotating period, as above described, results in pushing the disk 18 away from the bearing cage 6. As the disk 18 moves toward the left, the friction plate 20 with its lining 21 follows the disk 18 under the light pressure of the light pressure springs 26 positioned between the friction plate 20 and the pressure plate 19. The heavy springs 22 at the back of the pressure plate are thus adapted to be expanded so that the frictional pressure between the now rotating disk 18 and the friction lining 21 is that due to the light springs 26. It will be clear that the disk 18 does not begin to rotate with the nut 13 until the shaft 2 has almost completed one revolution, and the lug 14 has come into engagement with the pin 16, as already described. During this interval, the pressure has been released by the longitudinal movement of the disk 18 so that light springs 26 exert very little pressure between the disk 18 and the friction lining band 21. In other words, the braking is automatically reduced to a minimum when the driving shaft 2 starts to lift the load.

Now, let us assume that the shaft has come to rest with the load elevated, and it is desired to lower the load. The power will now be applied to the shaft 2 in such a direction as to impart to it a clockwise rotation. The load, however, under this condition will act as before through the worm 7 to exert a back pressure tending to hold the shaft towards the right against the end thrust bearings 3, and maintain the thrust washers 10 separated. At the beginning of the rotation of the shaft, the lug 14, which is bearing against the pin 16, rotates away from the pin until near the end of a revolution of the shaft. The lug again engages the pin 16 on its opposite side, after which the lug, acting through the pin 16, rotates the nut 13 and the disk 18 with the shaft. During the partial revolution just described, however, the nut 13 is stationary, and the screw-threaded member 11, which rotates with the shaft, causes the nut to move axially toward the right, thereby moving the disk 18 toward the bearing cage 6. As the disk moves toward the bearing cage, it carries with it the brake plate 20 with its brake lining 21, thereby compressing the light springs 26 so that the brake plate 20 comes in contact with the pressure plate 19. Further motion of the disk and brake plate 20 toward the right causes the pressure plate 19 to compress the main pressure springs 22. Consequently, when the disk 18 rotates with the shaft at the end of approximately one revolution of the shaft, the pressure exerted by the main springs 22 causes a frictional drag between the disk 18 and the friction lining 21 sufficient to cause immediate stopping of the rotation of the drum when power ceases to be applied to the power shaft. If the automatic arrangement of applying the brake to the power shaft, as above described, were not provided, the weight and momentum of the load being lowered together with the momentum of the mechanism for driving sprocket 2' would cause the drum to continue rotating after the power ceased to be applied to the shaft.

During the operations above described, the back pressure was in such a direction as to hold the shaft to the right against the thrust of the thrust bearings 3. If, when the brake is applied in the manner above described in lowering the load, the load should be removed from the rope, the worm 7 and shaft 2 are free to move to the left a distance equal to the clearance between the thrust washers 10. This end-wise motion of the shaft carries the disk 18 a corresponding distance to the left, thereby tending to move the brake plate 20 away from the pressure plate 19, thus releasing the heavy springs 22 and in effect releasing the brake. This action makes it possible to further unwind the rope from the drum without overcoming friction in the braking mechanism.

Instances may actually arise, although rarely, in which it is desirable to have the winch rope wound upon the drum in the opposite direction so that the load is lifted when the shaft 2 is rotated clockwise, and lowered when it is rotated counter-clockwise. In this case, the tension on the rope as it is being lowered or lifted acts through the worm 7 to thrust the shaft 2 to the left, bringing the thrust washers 10 into frictional contact, at the same time preventing the action of the automatic braking mechanism previously described. This condition is due to the fact that the disk 18 has been moved further to the left so that the brake plate 20 does not contact with the pressure plate 19 even when the nut 13 is moved to the right during the initial revolution of the shaft. Under these conditions, the friction between the thrust washers 10 produces a braking action both in winding and unwinding of the rope. The friction between these washers is then sufficient to hold the brake from rotating when power ceases to be applied. Of course, when the friction washers are applied in this manner, additional power must be applied to the shaft in elevating or lowering operations to overcome the braking effect due to the friction produced by the washers. As the winch will not ordinarily be used in this manner, however, this drawback is of minor consequence.

What is claimed is:

1. In a power mechanism, a power shaft, a disk adapted to rotate with the shaft, a friction member adapted to cooperate with said disk, a coupling between said disk and said shaft involving a loss of motion, and controlling means associated with said shaft and engaging said disk to produce an axial movement of the disk when the shaft rotates relatively to the disk, and tension members associated with said friction member, said coupling and controlling means being so constructed and arranged that when the shaft is rotated in one direction, said disk is moved axially without rotation until the loss of motion is taken up, thereby causing said disk to engage said friction member against the tension of said tension members to produce an automatic braking action, said shaft upon rotation in the opposite direction acting while the loss of motion is taken up to move said disk axially without rotation in such direction as to tend to separate the disk from said braking member and thereby at least partially defeating the braking action during further rotation of the shaft.

2. In a power mechanism, a power shaft, a screw-threaded stud affixed to said shaft, a brake disk having an internally screw-threaded nut associated therewith, the internal threads of said nut cooperating with the threads upon said stud, a coupling between the shaft and said nut comprising projecting members associated with the shaft and nut and adapted to engage each other with a loss of motion, a friction member adapted to engage with said disk, tension means adapted to act against said friction member, said friction member being non-rotatable but movable axially, tension members adapted to act against said friction member, said nut and threaded stud being so related that when the shaft begins to rotate in one direction the brake disk and the nut associated therewith do not rotate until the loss of motion between said coupling members is taken up, said threaded screw cooperating with said nut during the period of non-rotation of the nut to cause said nut to move said brake disk axially to press said friction member against the action of said tension means, thereby causing a braking action between the disk and friction member as the disk rotates after the loss of motion is taken up.

3. In a hoisting mechanism, a winch drum for raising and lowering a load, a power shaft for operating said drum, a braking mechanism comprising a disk member and plate member adapted to be frictionally engaged with each other, a coupling including a stop member between said power shaft and said disk member, said coupling being so related to said shaft and braking mechanism that during the initial operation of the shaft to rotate the drum in a direction to raise the load, said disk member and plate member tend to separate from each other to at least partially defeat the braking action during the further rotation of the shaft, said coupling acting, when the shaft is operated to rotate the drum in the reverse direction and to lower the load, to press said disk member and plate member together during the initial operation of the shaft to rotate the drum, thereby producing an automatic braking effect during the further rotation of the shaft.

4. In a hoisting mechanism, a winch drum for raising and lowering a load, a power shaft for operating said drum, a disk adapted to rotate with the shaft, a friction member adapted to cooperate with said disk, a coupling between said disk and said shaft involving a loss of motion, controlling means associated with said shaft and engaging said disk to produce an axial movement of the disk when the shaft rotates relatively to the disk, and tension members associated with said friction member, said coupling and controlling means being so constructed and arranged that when the shaft is rotated to drive the drum in one direction, said disk is moved axially without rotation until the loss of motion is taken up, thereby causing said disk to engage said friction member against the tension of said tension members to produce an automatic braking action, said shaft upon rotation to drive the drum in the opposite direction acting while the loss of motion is taken up to move said disk axially without rotation in such directon as to tend to separate the disk from said braking member and thereby at least partially defeating the braking action during further rotation of the shaft.

5. In a hoisting mechanism, a winch drum for pulling, raising and lowering a load, a power shaft for operating said drum, a screw-threaded stud affixed to said shaft, a brake disk having an internally screw-threaded nut associated therewith, the internal threads of said nut cooperating with the threads upon said stud, a coupling between the shaft and said nut comprising projecting members associated with the shaft and nut and adapted to engage each other with a loss of motion, a friction member adapted to engage with said disk, tension means adapted to act against said friction member, said friction member being non-rotatable but movable axially, tension members adapted to act against said friction member, said nut and threaded stud being so related that when the shaft begins to rotate to drive the drum in one direction the brake disk and the nut associated therewith do not rotate until the loss of motion between said coupling members is taken up, said threaded screw cooperating with said nut during the period of non-rotation of the nut to cause said nut to move said brake disk axially to press said friction member against the action of said tension means, thereby causing a braking action between the disk and friction member as the disk rotates after the loss of motion is taken up.

6. In a hoisting mechanism, a winch drum for raising and lowering a load, a power shaft for operating said drum, a thrust bearing associated with said shaft, friction elements associated with said shaft, a braking mechanism, controlling means therefor, said controlling means being so arranged that when the load is related to the drum in such manner as to thrust the shaft against said thrust bearing when the load is either raised or lowered, said controlling means will render the brake at least partially ineffective when the drum is operated to raise the load, but will cause the brake to be automatically applied when the drum is operated to lower the load, said friction elements being ineffective during both operations.

7. In a hoisting mechanism, a winch drum for raising and lowering a load, a power shaft for operating said drum, a thrust bearing associated with said shaft, friction elements associated with said shaft, a braking mechanism, controlling means therefor, said controlling means being so arranged that when the load is related to the drum in such manner as to thrust the shaft against said thrust bearing when the load is either raised or lowered, said controlling means will render the brake at least partially ineffective when the drum is operated to raise the load, but will cause the brake to be automatically applied when the drum is operated to lower the load, said friction elements being ineffective during both operations, and said controlling means being also arranged so that when the load is related to the drum in such manner as to thrust the shaft away from the thrust bearing during the operations of raising and lowering, the action of the braking mechanism will be defeated and said friction elements will coact to produce a braking action both in raising and lowering the load.

8. In a power mechanism, a power shaft, a braking mechanism therefor, means whereby when the shaft is rotated in one direction the brake is rendered at least partially ineffective in pulling and raising a load, means to automatically apply the brake when the shaft is rotated in the opposite direction when releasing or lowering a load, and means for rendering said braking mechanism ineffective when rotated in the latter direction without load.

9. In a hoisting mechanism, a winch drum for pulling, raising and lowering a load, a power shaft for operating said drum, a braking mechanism, means whereby when the shaft is operated to rotate said drum in such a direction as to pull or raise the load, the brake is rendered at least partially ineffective, means to automatically apply the brake when the shaft is rotated in such direction to cause the drum to release or lower the load, and means for rendering said braking mechanism ineffective when the shaft is operated to rotate the drum in the latter direction without the load.

10. In a hoisting mechanism, a winch drum for pulling, raising and lowering a load, a power shaft for operating said drum, a braking mechanism, means whereby when the shaft is operated to rotate said drum in such a direction as to pull or raise the load, the brake is rendered at least partially ineffective, means to automatically apply the brake when the shaft is rotated in such direction to cause the drum to release or lower the load, and means whereby end motion is permitted in the shaft to render the braking mechanism ineffective when the winch drum is operated without load.

In testimony whereof, we have signed our names to this specification this 10th day of September, 1929.

ALBERT E. FREEMAN.
WILLIAM T. LIVERMORE.